W. F. SCHMIDT.
WHEELED VEHICLE.
APPLICATION FILED FEB. 25, 1914.
1,146,107.
Patented July 13, 1915.
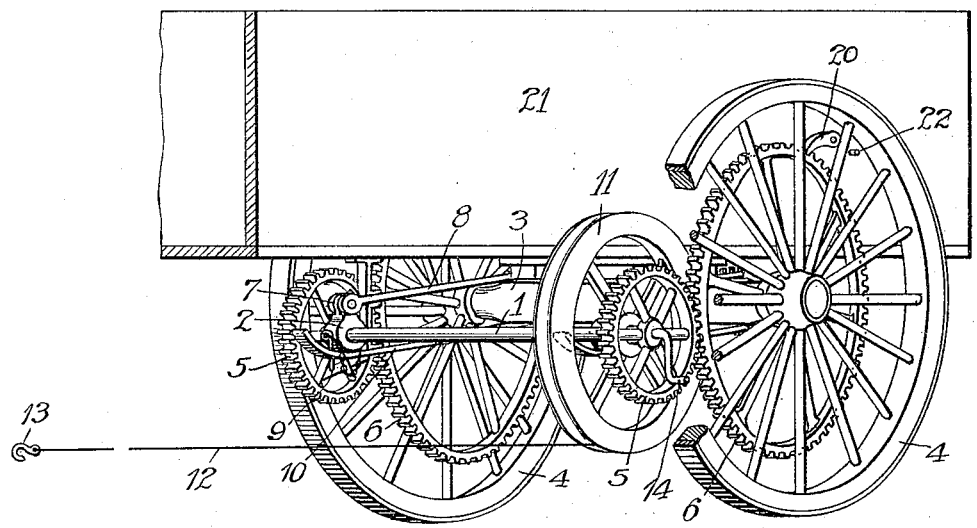
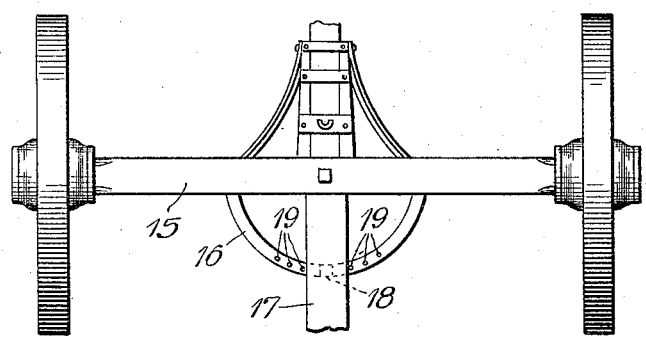
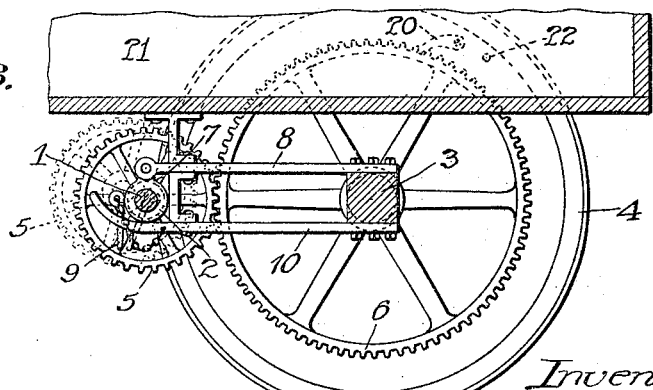

UNITED STATES PATENT OFFICE.

WILLIAM FRED SCHMIDT, OF PORTLAND, OREGON.

WHEELED VEHICLE.

1,146,107.          Specification of Letters Patent.          Patented July 13, 1915.

Application filed February 25, 1914. Serial No. 820,839.

*To all whom it may concern:*

Be it known that I, WILLIAM F. SCHMIDT, a citizen of the United States, and a resident of Portland, in the county of Multnomah and State of Oregon, have invented a certain new and useful Improvement in Wheeled Vehicles, of which the following is a specification.

This invention relates to wagons and other wheel vehicles designed and adapted to be propelled by outside power, as by horses or the like, in the usual way.

The object of the invention is to provide power means or mechanism for wagons and other vehicles having rolling traction with the ground and propelled by outside power, whereby, in emergency, as if the road is in very bad condition or on steep grades and the power available, when applied in the usual way, is not sufficient to propel said vehicle, said power may be applied through said power means or mechanism and greatly increased, thereby providing means whereby said vehicle may traverse almost any road in which the obstructions and grades are not absolutely prohibitive.

To accomplish the foregoing object my invention comprises the various features, combinations of features and details of construction hereinafter described and claimed.

In the accompanying drawing, in which my invention is fully illustrated, Figure 1 is a perspective view of the rear end of a wagon equipped with a power mechanism of my invention. Fig. 2 is a partial top plan view of the front end thereof, the box being removed, showing means for securing the front axle against pivotal movement; and Fig. 3 is a fragmentary side view, illustrating the construction of the supporting means for my improved power mechanism.

For purposes of illustration, I have, in the accompanying drawing, shown my invention as applied to and embodied in a familiar form of wagon, commonly known as a farm wagon. As regards its usual features and excepting as hereinafter particularly described, said wagon, or other vehicle to which my improved power mechanism is applied may be of any desired or approved construction and will be readily understood from an examination of the drawing without a detailed description thereof.

In accordance with my invention, what may be termed a counter shaft 1 is rotatably mounted in suitable bearings formed in journal boxes 2 which are supported by means of suitable connection with the rear axle 3 of the vehicle. The counter shaft 1 is adapted to be connected with one and preferably with both rear wheels 4 of the wagon by means of suitable driving connection therewith consisting, as shown, of pinions 5 secured to rotate with the counter shaft 1, which are adapted to intermesh with gears 6 secured to rotate with the rear wagon wheels 4.

The journal boxes 2 in which the counter shaft 1 is supported are preferably connected to the rear axle 3 of the wagon in such manner that said shaft 1 may be quickly and conveniently shifted bodily either backward or forward, to effect engagement and disengagement of the pinions 5 on said shaft with the gears 6 secured to the rear wagon wheels 4, suitable means being provided for securing said journal boxes in positions corresponding to engagement and disengagement of said pinions 5 with said gears 6. In the preferable construction shown, said journal boxes 2 are formed at the lower ends of links 7 pivoted at their upper ends to arms 8, rigidly secured to and which project frontward from the rear axle 3 thus providing for shifting said counter shaft 1 bodily, in the manner desired. Also, said journal boxes are adapted to be secured in positions corresponding to engagement and disengagement of the pinions 5 with the gears 6 by stop-pins 9 which are adapted to be inserted into holes in bars 10 likewise secured to and which project frontward from the rear axle 3 of the vehicle in line with and directly beneath said journal boxes 2. As shown in Fig. 1 and in full lines in Fig. 3, said pins 9 are inserted at the front sides of said journal boxes 2 in position to secure said journal boxes and the shaft 1 in position with the pinions 5 in engagement with the gears 6.

When the wagon is being drawn in the usual manner by horses attached directly thereto in the usual manner, the counter shaft 1 is preferably moved frontward to disengage the pinions 5 from the gears 6, thus eliminating the resistance to the movement of the wagon or other vehicle on account of the power absorbed in idly rotating said counter shaft and the parts carried thereby. As shown, this is effected by withdrawing the pins 9 and in turning the links 7 pivotally in proper direction to disengage said pinions 5 from the gears 6 and in again inserting the pins 9 at the rear sides of said journal boxes, which will secure said journal boxes and the counter shaft 1 in position corresponding to disengagement of said pinions 5, in the manner desired. Said retracted position of said counter shaft 1 and pinions 5 is shown in dotted lines in Fig. 3 of the drawing.

While I consider the construction shown as preferable, other means for accomplishing the objects sought will readily suggest themselves to expert mechanics, in view of my disclosure, and I do not therefore desire to limit myself to the construction shown, but desire to include all such modifications of my improved device for accomplishing the result sought.

Secured to rotate with the counter shaft 1 is a sheave 11 anchored to and adapted to be wound upon which is a cable 12, and in the operation of my improved propelling device, the free end of said cable is adapted to be attached to the whiffletree of the wagon, which has been disconnected from the wagon. As shown, said cable is provided with a hook 13 to provide for thus connecting said cable to the whiffletree, quickly and conveniently.

When it becomes necessary to employ my improved power transmitting mechanism, the whiffletree with the team hitched thereto is disconnected from the wagon and the rope or cable is attached thereto, the team is then driven forward in a direction to unwind said rope or cable 12 from the sheave 11, which will operate in an obvious manner to rotate the counter shaft 1 and, through the pinions 5, the gear wheels 6 and the rear wagon wheels 4. As the increase of power will result in a loss of movement, it may be necessary to wind the rope or cable 12 upon the sheave 11 a number of times in order to move the wagon a desired distance, either over a bad piece of road or up a steep incline. In this event the progress of the wagon will be in a series of steps or stages, the horses being first driven ahead until the rope or cable 12 is unwound from the sheave 11, said rope or cable 12 rewound upon said sheave 11 and the horses again driven ahead as before.

To provide for conveniently rewinding the rope or cable 12 on the sheave 11, the counter shaft 1 is preferably provided with a crank 14 for turning said counter shaft. Also, in rewinding, it will be necessary to disengage the pinions 5 from the gear wheels 6, as otherwise the rear wheels 4 would prevent rotation of counter shaft 1.

In order to effectively apply the power for propelling the vehicle by means of my improved power mechanism it will, of course, be necessary to guide the vehicle. This may be done by means of the tongue of the wagon. But, in accordance with my invention, I preferably guide the vehicle by securing and locking the front axle 15 of the wagon from turning, said axle being locked either parallel with or at an angle to the rear axle, as it is desired to have the vehicle travel in a straight line or on a curve. Simple means for thus locking the front axle 15 from turning consists in bolting the sway-bar 16 to the reach 17, the bolt 18 for bolting said sway-bar and reach together being interchangeable in a series of bolt holes 19 formed in said sway-bar, comprising a central bolt hole, which will lock the front axle 15 parallel with the rear axle and any desired number of holes 19 arranged in series on opposite sides of said central hole to provide for locking the front axle 15 in different angular positions relative to said rear axle, as it is desired to turn the wagon in one direction or the other and on a greater or less curve.

Where my improved power mechanism is utilized for propelling a vehicle up an incline of such length that it becomes necessary to rewind the rope or cable 12 upon the sheave 11, it will be necessary to provide means to prevent the wagon from running backward down said incline while the rope or cable 12 is being rewound. While my invention contemplates any desired or approved means for this purpose, I prefer the means shown in the drawing which consists of a pawl 20 pivoted to a rigid part of the wagon frame, as shown to the body portion or box 21 of said vehicle, said pawl, as shown, being mounted in proper position to engage the teeth of a gear wheel 6. When in use, the pawl 20 is adapted to be supported in inoperative position by turning the same pivotally so that its free end may rest on a stop pin 22, likewise secured in the wagon box 21.

I claim:—

1. A wheeled vehicle and emergency means for propelling said vehicle, said means comprising a countershaft rotatably mounted in bearings on the frame of the vehicle, a gear wheel secured to rotate with a wheel of the vehicle, a pinion on said countershaft adapted to intermesh with said gear wheel, the bearings for said countershaft being adjustable to provide for effecting engagement and disengagement of the pinion on said countershaft with the gear wheel on said vehicle wheel, substantially as described.

2. A wheeled vehicle and emergency means for propelling said vehicle, said means comprising a countershaft rotatably mounted in bearings on the frame of the vehicle, a gear wheel secured to rotate with a wheel of the vehicle, a pinion on said countershaft adapted to intermesh with said gear wheel, the bearings for said countershaft being adjustable to provide for engaging said pinion with and disengaging it from said gear wheel, and means for securing the bearings for said countershaft in positions corresponding to engagement and disengagement of said pinion with said gear wheel, substantially as described.

3. A wheeled vehicle and emergency means for propelling said vehicle, said means comprising a countershaft, journal boxes in which said countershaft is rotatably mounted, links on said journal boxes, arms secured to the rear axle of the vehicle to which said links are pivoted, a gear wheel secured to rotate with a rear wheel of said vehicle, a pinion secured to said countershaft adapted to intermesh with said gear wheel, and bars secured to the rear axle of said vehicle which extend beneath the journal boxes for said countershaft, and means on said bar for engaging and supporting the journal boxes for said countershaft in positions corresponding to engagement and disengagement of the pinion on said countershaft with said gear wheel, substantially as described.

4. A wheeled vehicle and emergency means for propelling said vehicle, said means comprising a countershaft, journal boxes in which said countershaft is rotatably mounted, links on said journal boxes, arms secured to the rear axle of the vehicle to which said links are pivoted, a gear wheel secured to rotate with a rear wheel of said vehicle, a pinion secured to said countershaft adapted to intermesh with said gear wheel, and bars secured to the rear axle of said vehicle which extend beneath the journal boxes for said countershaft, and means on said bar for engaging and supporting the journal boxes for said countershaft in positions corresponding to engagement and disengagement of the pinion on said countershaft with said gear wheel, said means comprising pins adapted to be inserted through holes formed in said bars in opposite sides of the journal boxes for said countershaft, substantially as described.

5. A wheeled vehicle and emergency means for propelling said vehicle, said means comprising a countershaft rotatably mounted in bearings on the frame of the vehicle, a gear wheel or wheels secured to rotate with the rear wheel or wheels of the vehicle, a pinion or pinions on said countershaft adapted to intermesh with said gear wheel or wheels, means for effecting engagement and disengagement of said pinion or pinions with said gear wheel or wheels, a sheave on said countershaft, and a rope or cable anchored thereto and adapted to be wound thereon by means of which said countershaft may be rotated by power outside of said vehicle, a crank on said countershaft adapted for rotating the same to wind said rope or cable on said sheave when said pinion or pinions are disengaged from said gear wheel or gear wheels, and locking means adapted for securing said vehicle against rearward movement, substantially as described.

In testimony that I claim the foregoing as my invention, I affix my signature in the presence of two subscribing witnesses this 31st day of January, 1914.

WM. FRED SCHMIDT.

Witnesses:
CLIFFORD B. DOBNEY,
ESTES SNEDECOR.

Copies of this patent may be obtained for five cents each, by addressing the "Commissioner of Patents, Washington, D. C."